(12) United States Patent
Frink et al.

(10) Patent No.: US 7,305,130 B2
(45) Date of Patent: *Dec. 4, 2007

(54) METHOD AND SYSTEM FOR DATA ENTRY OF HANDWRITTEN SYMBOLS

(75) Inventors: Lloyd Frink, Seattle, WA (US); Bryon Dean Bishop, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/511,706

(22) Filed: Aug. 28, 2006

(65) Prior Publication Data

US 2006/0291725 A1    Dec. 28, 2006

Related U.S. Application Data

(63) Continuation of application No. 10/611,489, filed on Jun. 30, 2003, now Pat. No. 7,116,822, which is a continuation of application No. 09/908,113, filed on Jul. 17, 2001, now Pat. No. 6,594,390, which is a continuation of application No. 09/386,248, filed on Aug. 31, 1999, now Pat. No. 6,269,187, which is a continuation of application No. 08/179,813, filed on Jan. 10, 1994, now Pat. No. 5,956,423, which is a continuation of application No. 07/716,723, filed on Jun. 17, 1991, now abandoned.

(51) Int. Cl.
*G06K 9/00*          (2006.01)

(52) U.S. Cl. ....................................................... 382/187
(58) Field of Classification Search ................ 382/100, 382/119, 177, 179, 186, 187, 309; 345/173, 345/179–183; 178/18–20
See application file for complete search history.

(56) References Cited

U.S. PATENT DOCUMENTS

| 5,956,423 | A  | * | 9/1999  | Frink et al. | ................. | 382/187 |
| 6,269,187 | B1 | * | 7/2001  | Frink et al. | ................. | 382/187 |
| 6,594,390 | B2 | * | 7/2003  | Frink et al. | ................. | 382/187 |
| 7,116,822 | B2 | * | 10/2006 | Frink et al. | ................. | 382/187 |

* cited by examiner

*Primary Examiner*—Jose L. Couso
(74) *Attorney, Agent, or Firm*—Workman Nydegger

(57) ABSTRACT

A method and system for data entry of handwritten text into a computer program that is not designed to accept handwritten text is provided. In preferred embodiments, the computer program is designed to operate in a windowing environment. A data entry program receives handwritten data, recognizes the data, and sends the recognized data to the computer program. The computer program processes the recognized data as if it had been entered from the keyboard. According to the present invention, the data entry program overlaps the window of the computer program with an invisible window. To the user, it looks as if the computer program is accepting handwritten data directly.

20 Claims, 12 Drawing Sheets

METHOD AND SYSTEM FOR DATA ENTRY OF HANDWRITTEN SYMBOLS

CROSS-REFERENCE TO RELATED APPLICATION

This application is a continuation of U.S. patent application Ser. No. 10/611,489, filed Jun. 30, 2003, now U.S. Pat. No. 7,116,822,which is a continuation of U.S. patent application Ser. No. 09/908,113, filed Jul. 17, 2001, now U.S. Pat. No. 6,594,390, which is a continuation of U.S. patent application Ser. No. 09/386,248, filed Aug. 31, 1999, now U.S. Pat. No. 6,269,187, which is a continuation of U.S. patent application Ser. No. 08/179,813, filed Jan. 10, 1994, now U.S. Pat. No. 5,956,423, which is a continuation of U.S. patent application Ser. No. 07/716,723, filed Jun. 17, 1991, now abandoned.

TECHNICAL FIELD

This invention is related to a method and computer system of data entry of handwritten characters and, in particular, data entry in a windowing environment.

BACKGROUND OF THE INVENTION

Handwriting recognition systems are being developed to allow users to input handwritten data into a computer. An electronic tablet allows a user to hand write data that the computer can recognize. The user writes data on the electronic tablet with a special pen. As the user moves the pen across the tablet, the tablet displays "ink." The tablet senses the position of the pen as the user writes and sends the position data to the computer. The computer receives this position data and converts it to recognized symbols, such as letters or numbers, in a convenient format, such as ASCII format. The computer then processes the formatted characters.

Some handwriting recognition systems recognize no only characters, letters and punctuation, but also gestures. Gestures are handwritten symbols that are typically used to represent editing commands or to produce non-printing text. For example, a handwritten backlash over a letter may mean delete the letter, a caret in between two letters may mean insert text, or a vertical line with an arrow to the left may mean insert a carriage return. Gestures are used extensively when printed documents are edited. During recognition, these gestures are converted to a convenient format for use by the computer.

These handwriting recognition systems use algorithms to map handwritten data to symbols. Typically, these systems internally store a prototype for each symbol that can be recognized. A prototype is a "picture" of a handwritten symbol that is used to map handwriting to a symbol. A system that recognizes just capital letters may have only 26 prototypes: one for each capital letter. Recognition systems use recognition algorithms to map handwritten data to a prototype. As long as the user writes like the prototypes, the handwritten data is successfully recognized. Conversely, the more dissimilar the handwritten data and the prototype are, the more likely it is that the handwriting styles and legibility of the handwriting. For example, the handwritten word "dear" may be misrecognized as the word "clear" depending the way the user writes a "d" and the prototypes for the letters "d," "c," and "l."

Although some computer programs are written to accept handwritten data, most computer programs are designed to receive data typed by a user at a computer keyboard. Such programs are call non-pen programs, that is, the programs are not designed to support handwritten data entry. It is often desirable to allow users the option to input data through a keyboard or by handwriting. Many people are not proficient at typing. They shun using computers because it is burdensome to enter data. These people, however, would use a computer if the computer program would accept handwritten data entry. Also, there are many situations where the use of a keyboard is impractical and where the use of handwritten data entry would be practical.

Many of the non-pen application programs are written for a windowing environment. One such windowing environment is Windows by Microsoft Corporation of Redmond, Wash. Several operating systems also have integrated windowing environments. In a windowing environment, each application program is assigned a window. The windows for several programs can be shown on the computer display simultaneously. Typically, the windowing environment supports multitasking, that is, multiple programming may be operating concurrently. The windowing system controls the positioning and size of the windows on the screen. Typically, the user has considerable flexibility in arranging the windows. In most windowing systems, the windows can overlap. The window that logically overlaps obscures the overlapped window.

It would require extensive redesigning and reprogramming to adapt non-pen programs to accept handwritten data. In some situations, it may not be economically feasible to adapt a non-pen program. The costs of the adaptations may not be offset by increased revenue resulting from the program accepting handwritten data. It would be desirable if these non-pen application programs could receive handwritten data without the need to adapt the non-pen application program. It would be desirable if the non-pen program could also receive handwritten gestures.

SUMMARY OF THE INVENTION

The methods of the present invention provide for the data entry of handwritten data into a computer program that is not designed to accept handwritten data. According to the methods, a non-pen application program operates in a windowing environment. A handwriting data entry program detects when a user wants to input handwritten data. The data entry program creates an "invisible" window, which preferably overlaps the application window. An "invisible" window is a window that when created and displayed has no visual effect on the display. The windowing environment internally treats the creating and displaying of an invisible window like a visible window. However, when the user writes with the pen, the data entry program inputs the handwritten data, converts the data to recognized symbols, and erases the handwritten data from the display. The data entry program then sends the recognized symbols to the application program as virtual keyboard or mouse events. The application program then processes the virtual keyboard or mouse events as if the events were enter from the keyboard or mouse.

In preferred embodiments, the methods automatically detect when the user wants to input handwritten data to a non-pen application. The data entry program monitors all pen down events. The user starts entering handwritten data by writing over a data entry area of the application window. When the data entry program detects a pen down within a data entry area of the application window, the data entry program starts the collection and recognition process. When the user stops writing for a period of time, the data entry program assumes that the user has finished the handwritten data entry.

In a preferred embodiment, the data entry program inputs gestures from the user. The data entry program converts a recognized gesture to keyboard or mouse events or other standard messages that will effect the function of the gesture. The data entry program then sends these events to the application program as virtual events. When the application program receives the virtual events, it processes them as if they came from the keyboard or mouse.

It is an object of the present invention to provide a method and system for allowing non-pen application programs to receive handwritten data entry.

It is another object of the present invention to provide a method and system for using an invisible window to input handwritten data and send the recognized symbols to an application program.

It is another object of the present invention to provide a method and system for detecting when a non-pen application program is in a data entry mode.

It is another object of the present invention provide a method and system for allowing a non-pen application program to process gesture data entry.

These and other objects will become apparent as the invention is more fully described below.

DETAILED DESCRIPTION OF THE INVENTION

Figure 1:
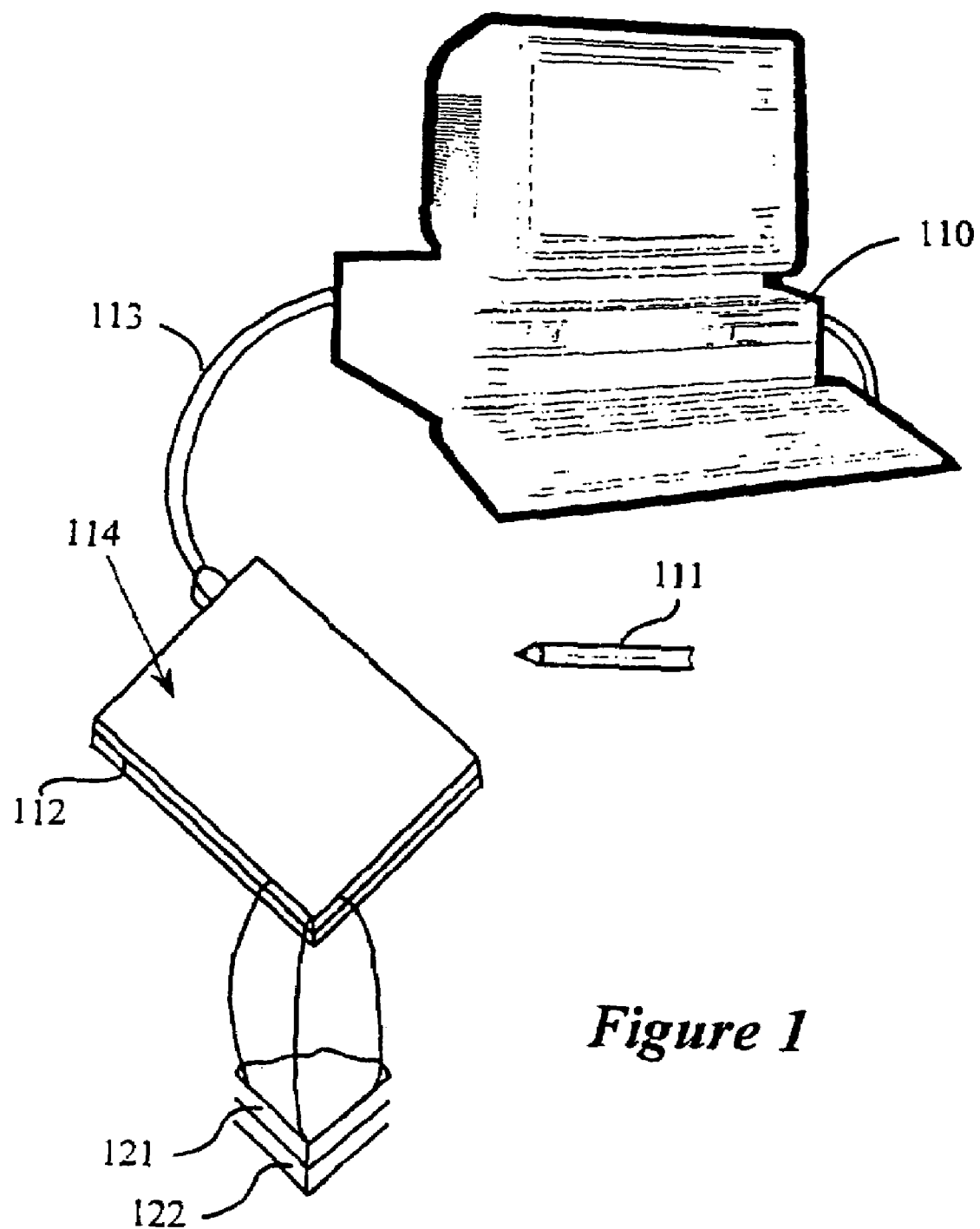
FIG. 1 shows a computer system configured to implement the methods of this invention.

FIG. 1 shows a computer system configured to implement the methods of the present invention. The computer system comprises a computer 110, a pen 111, a digitizing tablet 112, and a connecting cable 113. The tablet 112 comprises input grid 121 and the display surface 122. The input grid 121 detects contact of the pen 111 with the tablet 112. If contact is detected, then the tablet 112 sends the coordinates of the contact point to the computer 110 through the connecting cable 113. The tablet 112 periodically samples the input grid 121. Upon receiving the coordinates, the computer 110 "inks" the contact point, that is, the computer 110 sends data to the tablet 112 to turn on a point on the display surface 122 that corresponds to the contact point. The display surface 122 is a standard bitmap display. To a user it looks as if the pen writes the point onto the tablet 112 where the pen 111 made contact. With an appropriate sampling rate, the computer 110 inks multiple contact points as the user moves the pen 111 across the tablet 112. Thus, the computer system allows the user to write data onto the tablet 112. Other computer system configurations are acceptable to implement the methods of the present invention. For example, the entire system can be incorporated in a tablet shaped device. The tablet surface is the input grid an display surface. The tablet shaped device contains the logical equivalent of computer 110 without the display, keyboard, or disk drives.

Figure 2A:
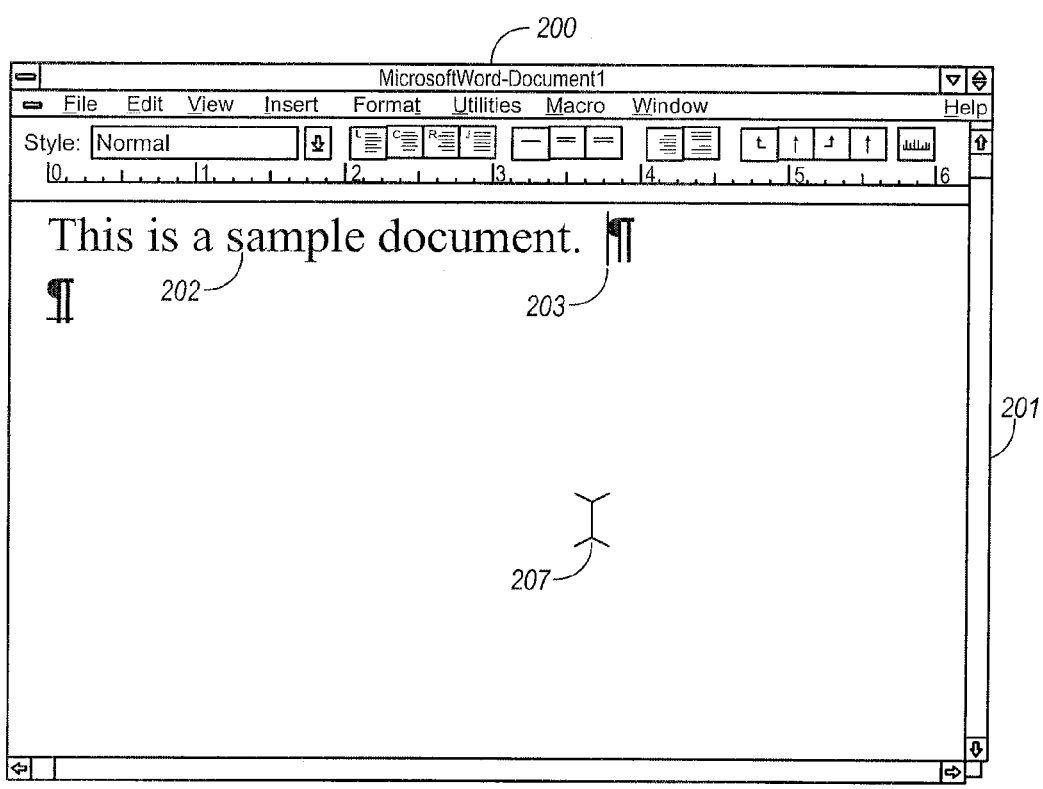
FIG. 2A shows a typical display of the word processing package Microsoft Word for Windows.
Figure 2B:
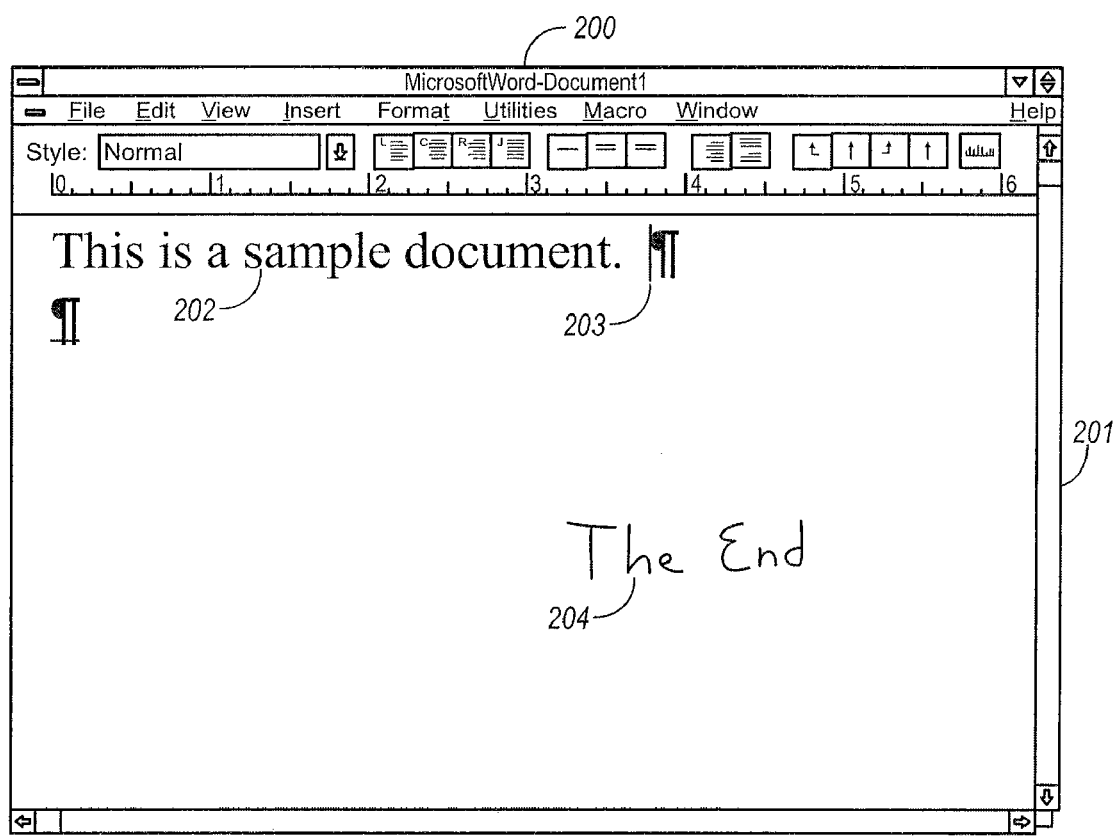
FIG. 2B shows the display surface after the user has handwritten text.
Figure 2C:
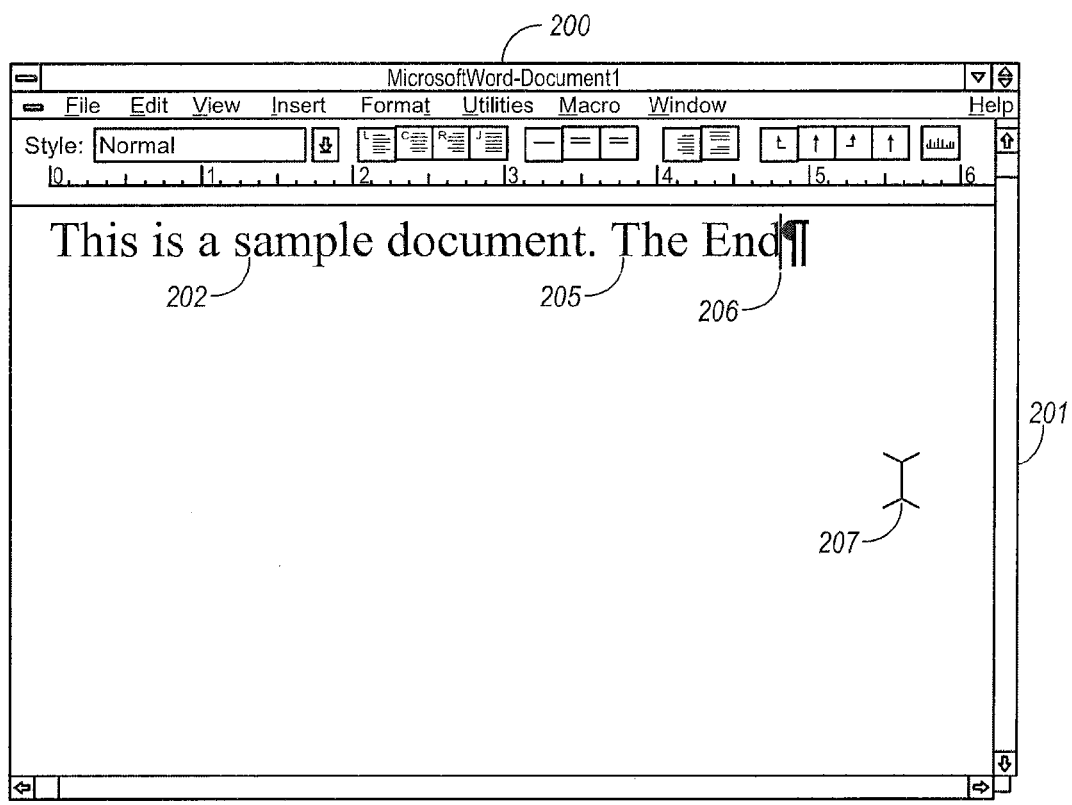
FIG. 2C shows the display surface after the handwritten text is recognized and received by the word processor.

The methods of the present invention allow the user to input data from a tablet into an application program that is not designed to receive handwritten data (a non-pen application). Although the methods are described as implemented with the Windows system by Microsoft, one skilled in the art would recognize that the methods can be implemented on other windowing systems and some methods can be implemented on non-windowing systems. FIG. 2A through 2C show a typical user interface employing the methods of the present invention. FIG. 2A shows a typical display 200 of the word processing package Microsoft Word for Windows. Display 200 is displayed on the display surface 122. A user of Word typically enters text into data entry window 201 through a keyboard. Text 202 comprises sample text data. Insertion pointer 203 indicates the position at which newly entered text will be inserted into the word processing document. The cursor 207 is an I-beam shape. FIG. 23 shows the display surface 122 after the user has handwritten the text "The End" 204, which is to be inserted into the document. With the pen 111, the user writes the text "The End" 204 onto the tablet 112. When the user completes writing the text, the text is inserted as shown in FIG. 2C. A recognizer converts the handwritten text 204 to the ASCII format. The recognized text is then sent to the word processor for insertion at the insertion pointer 203. The insertion pointer is repositioned at the end of the newly entered text "The End" 205. The handwritten text 204 is removed from the display 200 before the text is sent to the word processor.

In a preferred embodiment of the present invention, an "invisible" window is used to capture handwritten data. The handwritten data is recognized, and the recognized data is sent to a non-pen application. An invisible window is a window with no frame, title bar, et. When an invisible window is displayed, the data in the overlapped windows is not overwritten. Rather, the overlapped windows show through the invisible window. Thus, it is not possible to visually detect an invisible window until data is sent to the invisible window. For example, in FIG. 2A once a pen down (contact with the input grid) is detected the word processing window is overlapped by an invisible window that covers the entire word processing window. FIG. 2B shows the effect of handwritten data sent to the invisible window. The handwritten data is the only indication that an invisible window exists. To the user, it seems as though the word processing window is accepting the handwritten data directly. However, the word processor is a non-pen application. The handwritten data is actually sent to the invisible window, which is created by a handwriting data entry program.

In a preferred embodiment, the start of handwriting is detected by the pen contracting the input grid (pen down). The end of handwriting is detected when the pen is not in contact with the input grid (pen up) for a period of time, which may be predetermined or may vary depending on the pace of user handwriting. Alternately, the start and stop of handwriting can be detected by selection of a menu item in a visible window of the data entry program.

Figure 3:
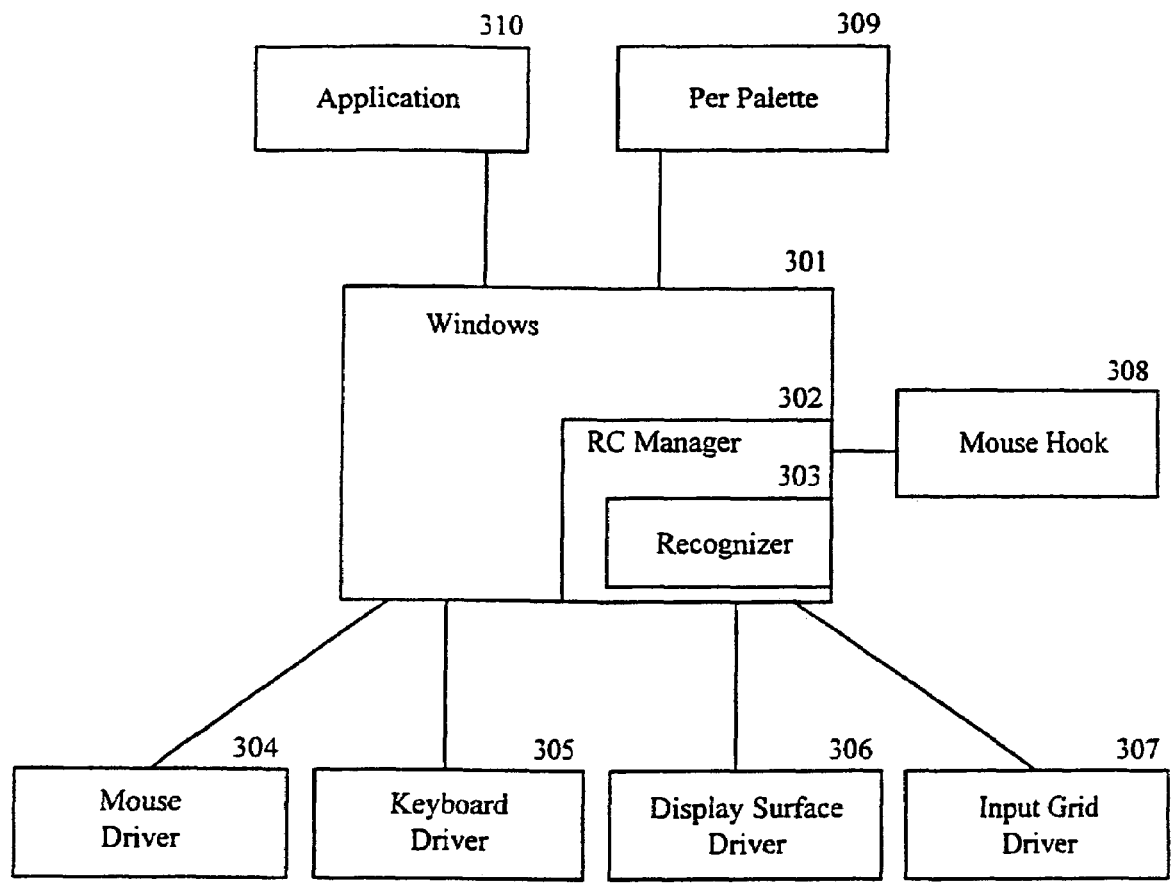
FIG. 3 shows components of a preferred embodiment of the present invention.

FIG. 3 shows components of a preferred embodiment of the present invention. Windows 301 includes a recognition context (RC) manager 302. The RC manager 302 comprises the functionality of Windows 301 that supports handwritten data entry. The RC manager 302 controls the inputting of the raw handwritten data from the input grid drive 307 and the inking of the display surface through the display surface driver 306. The recognizer 303, which is a function of the RC manager 302, receives raw handwritten data from the RC manager, recognizes the raw data as symbols, and returns the recognized symbols. The methods of the present invention are not dependent on any specific recognition technique. Rather, the methods of the present invention are independent of the recognition technique. The mouse driver 304 and the keyboard driver 305 are standard device drivers. The display surface driver 306 receives data from the RC manager 302 and displays the data on the tablet. The input grid driver 307 receives the coordinate data from the input grid and sends the data to the RC manager 302. The mouse hook 308 receives every mouse message that Windows 301 generates. The facility to hook mouse events is a standard feature of Windows. The mouse hook 308 detects when the user wants to enter handwritten data into a non-pen application 310. This detection enables the automatic handwriting mode. In a preferred embodiment, Windows 301 generates a mouse left button down message when a pen down occurs. This allows Windows 301 and application programs to treat pen down like a mouse event. Windows 301 can determine whether a mouse event was generated as a result of a mouse or a pen. Pen Palette 309 is the application that controls the entry of the handwritten data and sending of the recognized symbols to application 310. In operation, the mouse hock 308 sends a message to Pen Palette 309 when it detects that the user wants to input handwritten data (enter automatic writing mode). Pen Palette 309 receives the handwritten data, converts it to recognized symbols, and then sends the recognized symbols to Windows 301 as virtual keyboard or mouse events. A virtual event is not generated by the physical device, but rather is generated by a program and sent to Windows 301 to be treated as if the physical event occurred. For example, a virtual keyboard event occurs when a letter is recognized as part of the handwritten data and Pen Palette 309 sends the letter to Windows 301 to be treated as if it were entered from the keyboard. Windows can determine whether an event is virtual or physical.

Figure 4A:
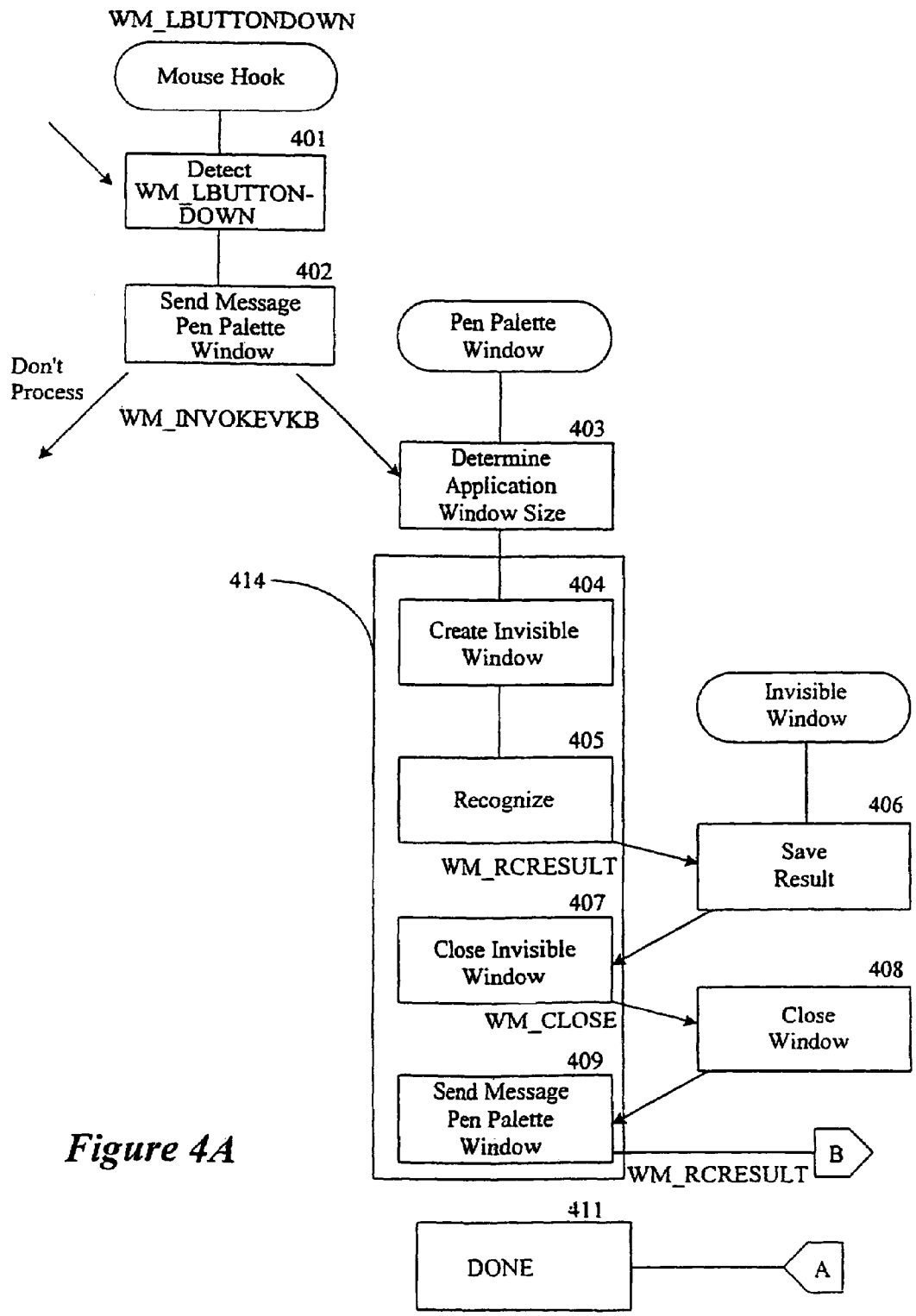
FIGS. 4A-B is a flow diagram of the processing in a preferred embodiment of the present invention.
Figure 4B:
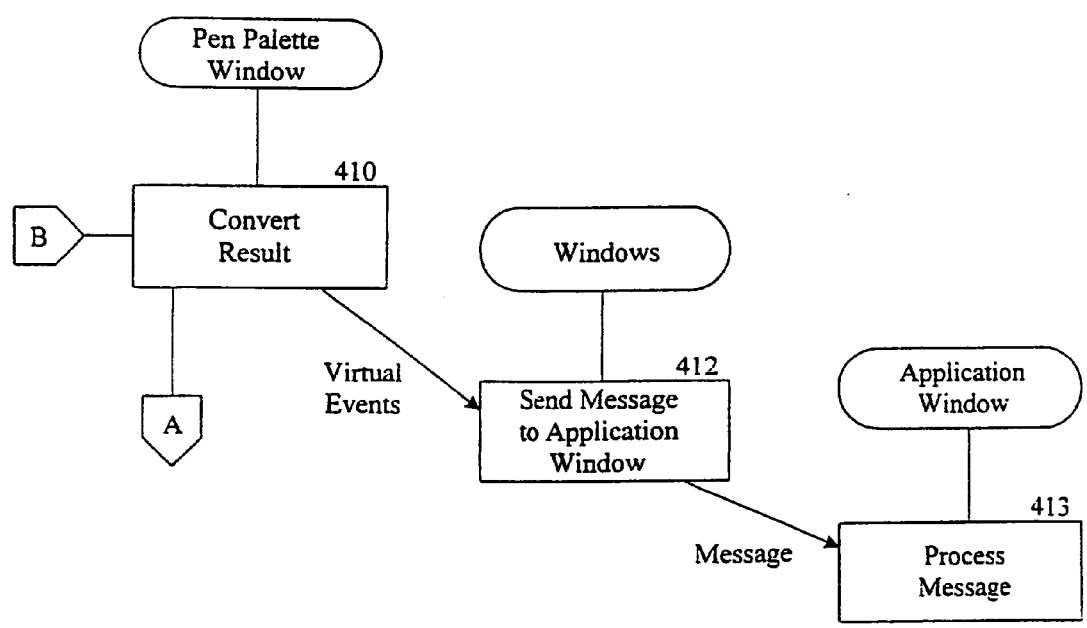

FIG. 4 is a flow diagram of the processing in a preferred embodiment of the present invention. The process begins when the mouse hook receives a WM_LBUTTONDOWN message from Windows. In block 401, the mouse hook enables the automatic handwriting mode if the message is generated as a result of a pen event and if the cursor is an I-beam share. In block 402, if the automatic writing mode is enabled, then the mouse hook sends a WM_INVOKEVKB message to the Pen Palette window and sends an indication to Windows not to process the left button down mouse message. If the automatic writing mode is not enabled, then the mouse hook sends an indication to Windows to process the message. The WM_INVOKEVKB message indicates that the Pen Palette window is to start input of handwritten data through an invisible window and to send the recognized symbols to the application. In block 403, when the WM_INVOKEVKB is received, the Pen Palette window determines the size and position characteristics of the application window. The invisible window is preferably slightly larger than and overlaps the application window. However, it may also fill the entire display surface or only a portion of the application window. The processing in block 414 corresponds to the function ProcessWriting (explained below) that is called by Pen Palette. In block 404, the Pen Palette window creates the invisible window. The creation process saves the bitmap for the portion of the display that the invisible window overlaps. This creation process initializes data internally within Windows. Because the window is invisible, the display is not affected. The saved bitmap is used to restore the display when the invisible window is closed. In block 405, the Pen Palette window invokes the function Recognize. The function Recognize inputs the handwritten data, sends the corresponding ink to the display surface, and converts the handwritten data into recognized symbols. The function Recognize detects when the user steps writing. When the function Recognize completes, it sends an WM_RCRESULT message to the invisible window. The WM_RCRESULT message indicates that the recognition is complete. In block 406, the invisible window saves the recognized symbols and returns control to the Pen Palette window. In block 407, the Pen Palette window sends a WM_CLOSE message to the invisible window. In block 408, the invisible window processes the WM_CLOSE message. When the invisible window is closed, the overlapped bitmap that was saved when the invisible window was created is restored. This restoration effectively erases the handwritten data on the display. Control then passes back to the Pen Palette window. In block 409, the function Process-Writing, which is invoked by the Pen Palette window, sends a WM_RCRESULT message to the Pen Palette window. This message indicates to the Pen Palette window that recognition is complete and the recognized symbols are available. In block 410, the Pen Palette window converts the recognized symbols to virtual events. It converts gestures to their mouse or keyboard equivalent virtual events or standard system messages and characters to their keyboard equivalent virtual events. Block 410 then sends these virtual events to Windows. Block 410 also returns control to the WM_INVOKEVKB invocation of the Pen Palette window in block 411 to complete that invocation. In block 412, windows receives virtual events and sends messages corresponding to the events to the application window. The messages include the keyboard event and mouse event messages. In block 413, the application window receives and processes the messages as if the events were actually received from the keyboard or mouse. In the example of FIGS. 2A through 2C, the word processing program inserts the text characters corresponding to the handwritten data into the document.

FIGS. 5 through 9 are flow charts showing a preferred embodiment of the present invention. Appendix A contains the "Microsoft Windows Graphical Environment for Pen Computing SDK—Guide to Programming" manual. This manual explains in detail the application programming interface for the Windows pen-based system.

Figure 5:
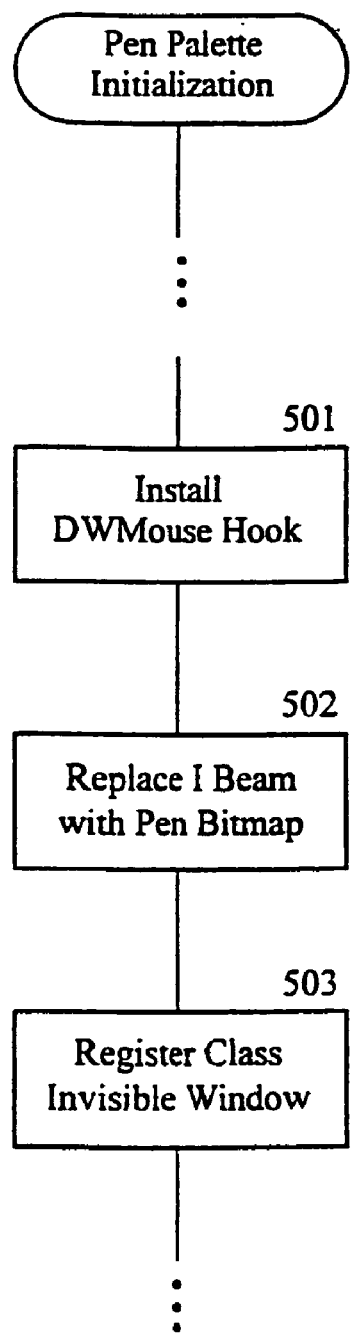
FIG. 5 is a partial flow diagram of the Pen Palette initialization routine.

FIG. 5 is a partial flow diagram of the Pen Palette initialization routine. This initialization routine installs the mouse hook, replaces the I-beam bitmap with an automatic writing bitmap, and registers the class for the invisible window. The Pen Palette application installs a mouse hook to trap messages corresponding to left button down mouse events. When a mouse hook is installed to trap mouse messages, Windows invokes the mouse hook to process each mouse message. When the mouse hook returns to Windows, it indicates whether Windows should proceed with normal processing of the mouse message or not process the mouse message. Referring to FIG. 5, in block 501, the routine installs the function DWMouseHook as a mouse hook. In block 502, the routine replaces the bitmap for the I-beam cursor with a bitmap that indicates automatic writing is enabled. In a preferred embodiment, the routine accesses the handle of the I-beam cursor. The routine makes a copy of the I-beam bitmap and then copies the automatic writing bitmap over the original I-beam bitmap. Whenever the application intends to display the I-beam cursor, the automatic writing cursor is displayed instead to indicate that handwritten data can be received. In block 503, the class for the invisible window is registered with Windows. The class specifies a null background brush and the save bits flag. The null background brush indicates that the display area which the invisible window overlaps is not erased. The save bits flag indicates that the bitmap for the display area which the invisible window overlaps is saved so that the bitmap can be restored when the invisible window is closed.

Figure 6:
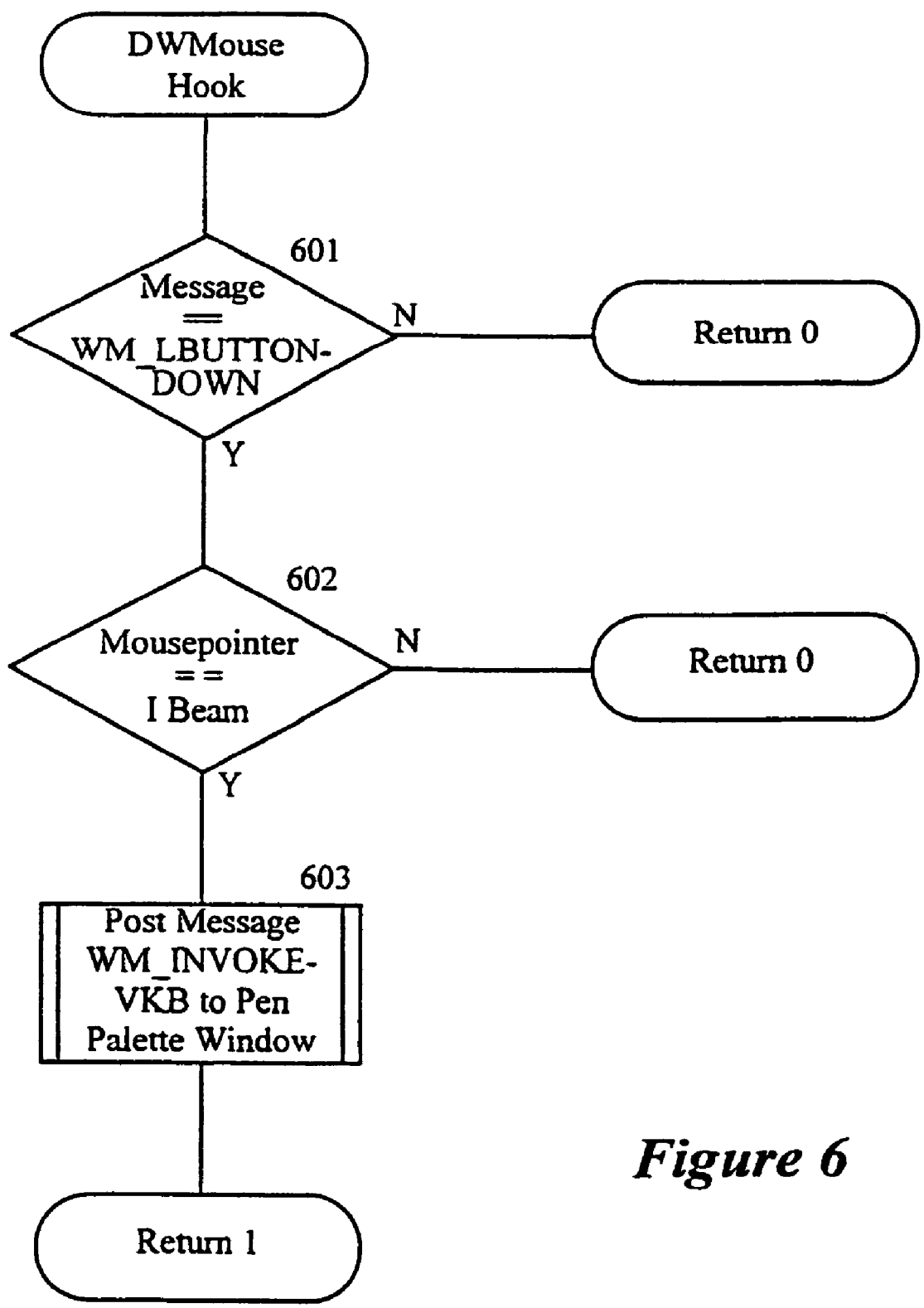
FIG. 6 is a flow diagram of the function DWMouseHook.

FIG. 6 is a flow diagram of the function DWMouseHook. Windows sends all mouse messages to the function DWMouseHook. The function DWMouseHook traps out left button down messages generated by a pen when the cursor indicates the I-beam. In a preferred embodiment the bitmap for the I-beam cursor is replaced by the automatic writing bitmap. When a trap occurs, the function posts a message to the Pen Palette window indicating that it should start the automatic writing recognition. A left button down occurs when the pen contacts the tablet. The function DWMouseHook traps only left button down messages generated by the pen. The function is called with a mouse message and the handle of the application window as parameters. The function returns a zero value when it does not process the message, which indicates that Windows should process the message, and a non-zero value when it does process the messages. Referring to FIG. 6, in block 601, if the message is WM_LBUTTONDOWN and it corresponds to a pen event, then the function continues at block 602, else the function returns with a zero value. In block 602, if the cursor indicates the I-beam, then a pen down has been detected (left mouse button message generated) and the cursor is over a data entry window and the function continues at block 603, else the function returns with a zero value. The detection of the I-beam allows the methods of the present invention to automatically detect that a user is starting to enter handwritten data. In operation, when Windows detects a mouse movement it sends mouse movement messages to the application. The mouse hook does not trap mouse movement messages. When the application detects that the mouse has moved over a text data entry field, the application requests Windows to set the cursor to the I-beam by passing the handle to the I-beam bitmap. Windows then displays the bitmap indicated by the handle. The use of the I-beam shape to indicate that the application is ready to receive data is standard programming practice in Windows. In a preferred embodiment, the methods of the present invention detect that a user is starting to enter handwritten data as follows. Windows detects a pen down and sends a mouse movement message to the application. If the pen down occurred over a text data entry field, the application responds to the mouse movement message by setting the cursor to indicate the I-beam. Windows then sends the left button down mouse message, which the mouse hook traps. The mouse hook ensures that the message was generated as a result of a pen event and checks the cursor. If the cursor handle indicates the I-beam, then the application is ready to receive data and entry of the handwritten data can proceed. Although the I-beam cursor is used to indicate data entry, some applications may use a different cursor display convention. In a preferred embodiment, the mouse hook can maintain a list of cursor handles that indicate data entry. Detection of the display of cursors corresponding to the handles in the list can be used to enable automatic handwriting. In a preferred embodiment, the list of handles can be mapped to the application programs that use a specific cursor to indicate data entry. The list can be updated dynamically to accommodate new applications that do not follow the I-beam convention. In block 603, the function posts a WM_INVOKEVKB message to the Pen Palette window. The handle of the application window is sent with the message. The function then returns to Windows with a one value.

Figure 7:
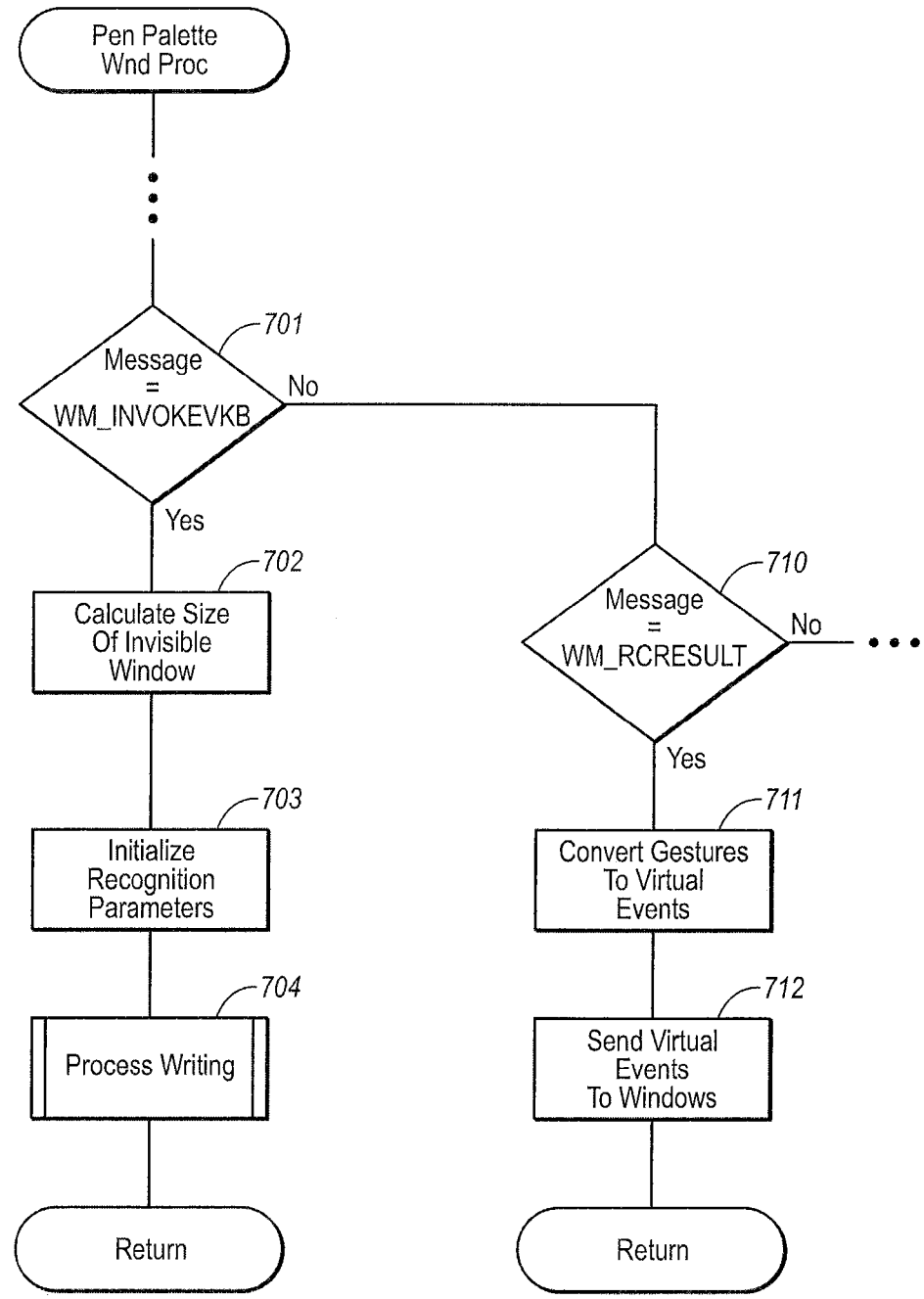
FIG. 7 is a flow diagram of the window procedure for the Pen Palette application.

FIG. 7 is a flow diagram of the window procedure for the Pen Palette application. This procedure processes the WM_INVOKEVKB message that is posted by function DWMouseHook and the WM_RCRESULT message that is sent by the recognizer. With the WM_INVOKEVKB message, this procedure receives as parameters the handle of the Pen Palette window and the handle of the application window. In block 701, if the message is not equal to WM_INVOKEVKB, then the procedure continues at block 710, else the procedure continues at block 702. In block 702, the procedure calculates the size of the invisible window. The size of the invisible window is preferably slightly larger than the application window. In block 703, the procedure initializes parameters for the recognition process. The recognition parameters typically include bounding rectangle for inking, handle of window to send results, ink width, list of allowable symbols, etc. In block 704, the procedure invokes function ProcessWriting (described below). The procedure then returns.

In block 710, if the message is not equal to WM_RCRESULT, then the procedure processes other messages as indicated by the ellipsis, else the procedure continues at block 711. In block 711, the procedure converts any gestures in the recognized symbols to equivalent events or messages. The methods of the present invention convert gestures into corresponding virtual events or messages. For example, the caret gesture, which means insert, is converted to a mouse movement event indicating the point of the caret and a left mouse button down event. When an application, such as a word processor, receives these events it moves the insertion pointer to the caret and is ready to insert data entry. In another example, a copy selection gestures, which means copy the selection to a clipboard, is converted to keyboard events, such as control-insert or a standard system message, such as WM_COPY in Windows. One skilled in the art will recognize that other gestures can be similarly converted to virtual events for processing by non-pen applications. In block 712, the procedure posts virtual mouse and keyboard events corresponding to the recognized symbols to Windows and returns.

Figure 8:
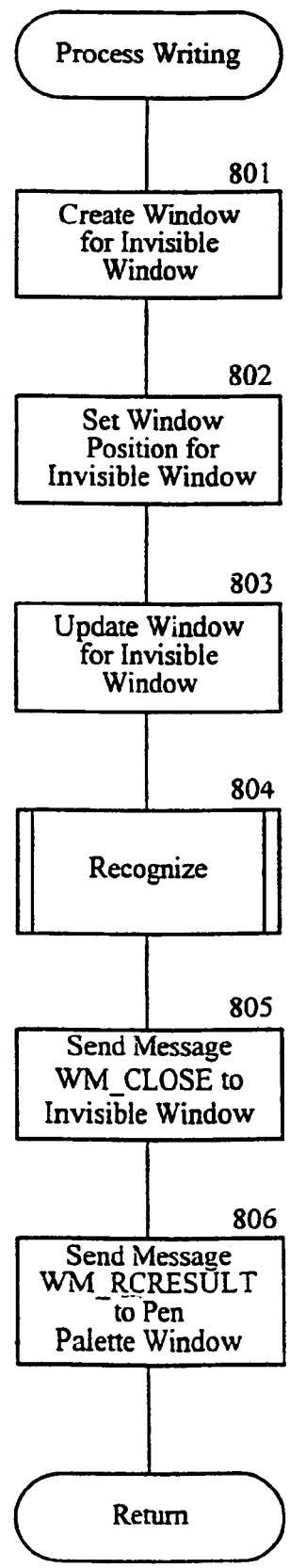
FIG. 8 is a flow diagram of the ProcessWriting function.

FIG. 8 is a flow diagram of the ProcessWriting function. The function ProcessWriting controls inputting raw handwritten data, inking the display surface, and converting the handwritten data to recognized symbols. The function ProcessWriting is called with two parameters: the handle of the Pen Palette window and the parameters for the recognition process. In a preferred embodiment, function ProcessWriting can be called by a pen-aware application to facilitate pen data entry through the use of an invisible window. In block 801, the function creates the invisible window. The invisible window is created as the topmost window and with no frame, title bar, or scroll bars to maintain invisibility. In block 802, the function sets the invisible window position on the display surface. In block 803, the function updates the invisible window. Although there is no visible effect of updating the invisible window, Windows initializes internal data structures. In block 804, the function invokes the function Recognize to input data using the invisible window and recognize the data. The function Recognize sends the recognized symbols along with the WM_RCRESULT message to the invisible window. In block 805, the function sends the WM_CLOSE message to the invisible window. When the invisible window is closed, bitmaps for the display area that the invisible window overlapped are restored. In block 806, the function sends the WM_RCRESULT message to the Pen Palette window. The function then returns.

Figure 9:
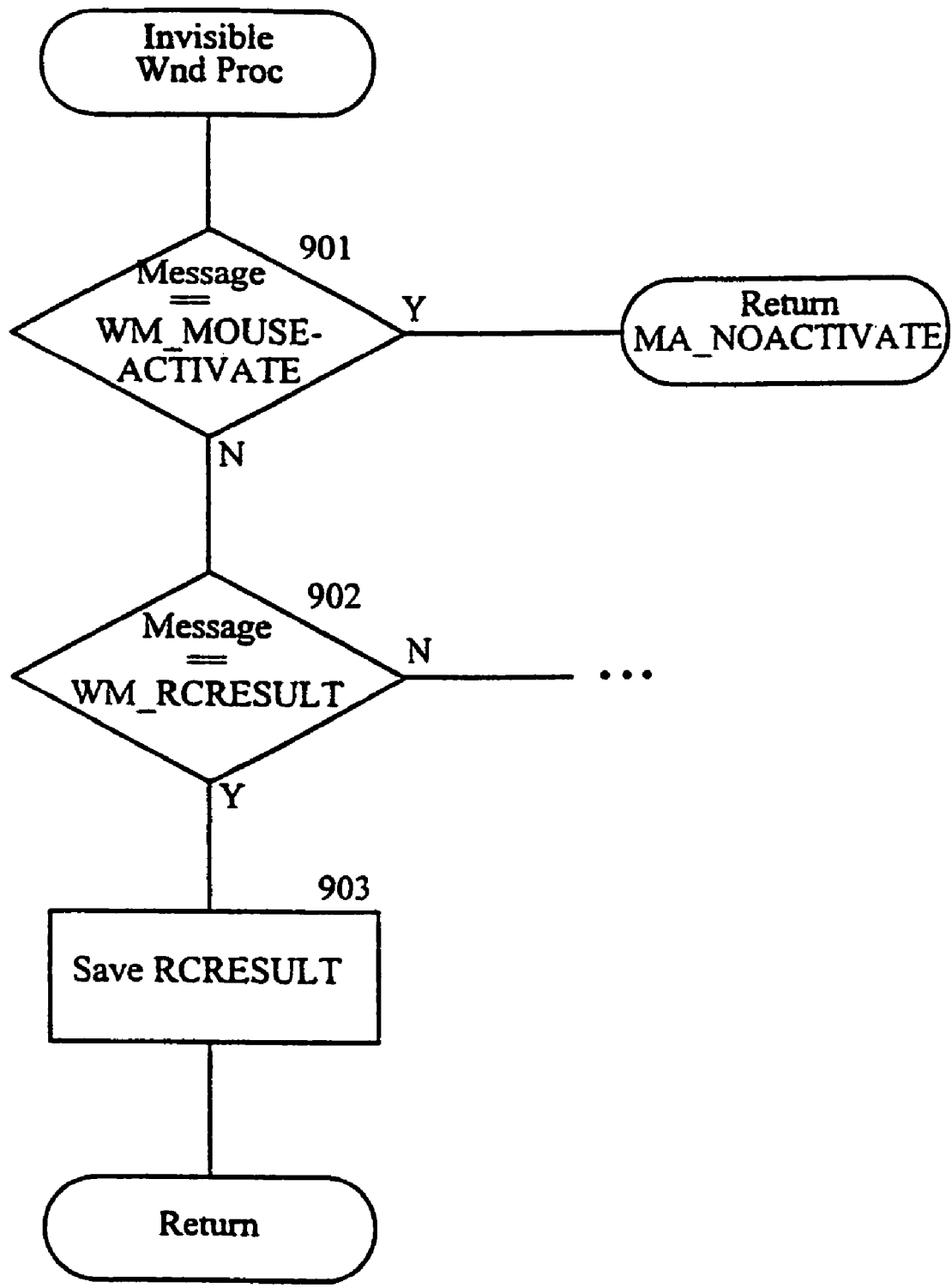
FIG. 9 is a flow diagram of the window procedure for the invisible window.

FIG. 9 is a flow diagram of the window procedure for the invisible window. The procedure processes two messages: WM_MOUSEACTIVATE and WM_RCRESULT. This procedure ensures that the invisible window is not given the focus and saves the recognized symbols. The window that has the focus is the window that receives the keyboard entries. In block 901, if the WM_MOUSEACTIVATE message is received, then the procedure returns with MA_NOACTIVATE, else the procedure continues at block 902. The WM_MOUSEACTIVATE message indicates that the invisible window is to be made the focus. Under normal processing, the title bar of the application losing the focus would be changed to indicate that it no longer has the focus. However, this procedure suppresses the normal processing by returning the MA_NOACTIVATE message. The net effect is not only that the window is invisible, but also that the application window does not change because the focus does not change. In block 902, if the WM_RCRESULT message is received, then the recognized symbols are to be saved and the procedure continues at block 903, else the procedure continues with the standard default message processing as indicated by the ellipsis. In block 903, the procedure saves the recognized symbols so that they can be retrieved by the Pen Palette window and the procedure returns.

Although the present invention has been described in terms of preferred embodiments, it is not intended that the invention be limited to these embodiments. Modifications within the spirit of the invention will be apparent to those skilled in the art. The scope of the present invention is defined by the claims that follow.

What is claimed is:

1. A computer-readable medium having stored computer-executable instructions which, when executed by a computing system, implement a method comprising:
   providing an area to receive handwritten data;
   detecting that a user wants to input a set of handwritten data directed towards a software program;
   receiving the set of handwritten data;
   detecting the end of the input of that set of handwritten data;
   converting the set of handwritten data into a virtual event corresponding to a keyboard event, mouse event or other system message; and
   providing the virtual event to the software program.

2. The computer-readable medium of claim 1 wherein providing the area to receive handwritten data comprises superimposing a superimposed window over at least part of a software program window corresponding to the software program.

3. The computer-readable medium of claim 2 wherein superimposing the superimposed window comprises specifying a window having attributes such that graphics beneath the superimposed window at least in part show through the superimposed window.

4. The computer-readable medium of claim 2 having further computer-executable instructions comprising, giving focus to the superimposed window upon detecting that the user wants to input the set of handwritten data.

5. The computer-readable medium of claim 2 having further computer-executable instructions comprising, closing the superimposed window and restoring graphics beneath the superimposed window to a previous state.

6. The computer-readable medium of claim 1 wherein detecting that the user wants to input a set of handwritten data comprises detecting when the software program is in a data entry mode.

7. The computer-readable medium of claim 6 wherein detecting that the software program is in the data entry mode comprises evaluating a cursor of the software program.

8. The computer-readable medium of claim 6 wherein detecting that the software program is in the data entry mode comprises determining that the pen down occurred over a text data entry field of the software program.

9. The computer-readable medium of claim 1 wherein detecting that the user wants to input a set of handwritten data comprises monitoring for a pen down event.

10. The computer-readable medium of claim 1 having further computer-executable instructions comprising, displaying a writing cursor to indicate that handwritten data can be received.

11. The computer-readable medium of claim 1 wherein detecting the end of the input of that set of handwritten data comprises detecting when the user has stopped entering handwritten input for a period of time.

12. The computer-readable medium of claim 11 wherein detecting when the user has stopped entering handwritten input for the period of time comprises, establishing a predetermined time as the period of time, or establishing the period of time based on a pace of user handwriting.

13. The computer-readable medium of claim 1 wherein detecting the end of the input of that set of handwritten data comprises detecting an explicit user command.

14. The computer-readable medium of claim 1 wherein converting the set of handwritten data into the virtual event comprises converting a gesture to a mouse or keyboard equivalent virtual event, or converting a system message or character to a keyboard equivalent virtual event.

15. The computer-readable medium of claim 1 wherein providing the virtual event to the software program comprises providing data corresponding to the virtual event to an operating system component, and sending the virtual event from the operating system component to the software program.

16. In a computing device, a system comprising:
   means for detecting that a user wants to input a set of handwritten data directed towards a first program;
   means for receiving the set of handwritten data at a second program that is different from the first program;
   means for communicating the set of handwritten data from the second program to a recognizer and receiving recognition data corresponding to the handwritten data from the recognizer; and
   means for sending a virtual event corresponding to the recognition data to the first software program.

17. The system of claim 16 wherein the means for receiving the set of handwritten data comprises a window corresponding to the second program that receives at least one handwritten gesture, symbol, system message or character as the set of handwritten data.

18. The system of claim 16 wherein the means for detecting when the user wants to input a set of handwritten data comprises means for detecting when the software program is in a data entry mode, means for evaluating a cursor of the software program, or means for determining that the pen down occurred over a text data entry field of the software program, or any combination thereof.

19. In a computing device, a system comprising:
a first program having a window that receives handwritten input directed towards a second program that is ready to receive non-handwritten input;
a recognizer coupled to the first program that provides recognition data corresponding to the handwritten input;
an operating system component coupled to the first program that receives the recognition data or data corresponding to the recognition data from the first program, the operating system component further coupled to the second program to provide a virtual event corresponding to the recognition data or the data corresponding to the recognition data to the second program.

20. The system of claim 19 wherein the handwritten input comprises a handwritten gesture, a symbol, a system message or a character, and wherein the virtual event comprises at least one mouse equivalent event, at least one keyboard equivalent event, at least one character equivalent event or at least one system message equivalent event, or any combination of at least one mouse equivalent event, at least one keyboard equivalent event, at least one character equivalent event or at least one system message equivalent event.

* * * * *